(12) United States Patent
Hughes et al.

(10) Patent No.: US 9,116,851 B2
(45) Date of Patent: Aug. 25, 2015

(54) SYSTEM AND METHOD FOR VIRTUAL TAPE LIBRARY OVER S3

(71) Applicant: FutureWei Technologies, Inc., Plano, TX (US)

(72) Inventors: James Hughes, Palo Alto, CA (US); Thai Nguyen, Thornton, CO (US)

(73) Assignee: Futurewei Technologies, Inc., Plano, TX (US)

( * ) Notice: Subject to any disclaimer, the term of this patent is extended or adjusted under 35 U.S.C. 154(b) by 318 days.

(21) Appl. No.: 13/730,504

(22) Filed: Dec. 28, 2012

(65) Prior Publication Data
US 2014/0189269 A1 Jul. 3, 2014

(51) Int. Cl.
*G06F 12/02* (2006.01)
*G06F 11/14* (2006.01)
*G06F 17/30* (2006.01)

(52) U.S. Cl.
CPC ........ *G06F 11/1456* (2013.01); *G06F 11/1464* (2013.01); *G06F 17/30194* (2013.01); *G06F 2201/815* (2013.01); *G06F 2212/263* (2013.01)

(58) Field of Classification Search
CPC .................... G06F 2212/263; G06F 2212/154; G06F 11/1456; G06F 11/1464; G06F 17/30194; G06F 2201/815
See application file for complete search history.

(56) References Cited

U.S. PATENT DOCUMENTS 7,443,320 B2 * 10/2008 Lim et al. .......................... 341/67
2014/0007239 A1 * 1/2014 Sharpe et al. ................... 726/24

OTHER PUBLICATIONS

"Amazon Simple Storage Service," Getting Started Guide, API Version, Mar. 1, 2006, 20 pages.

* cited by examiner

*Primary Examiner* — John Lane
(74) *Attorney, Agent, or Firm* — Slater & Matsil, L.L.P.

(57) ABSTRACT

System and method embodiments are provided herein to enable VTL backup and retrieval over S3 storage technology. An embodiment method includes mapping a plurality of data blocks for VTL storage into a plurality of S3 objects for S3 storage, and storing the S3 objects at one or more locations for S3 storage over one or more networks, wherein the mapping enables stateless backup and restore of the data blocks. An embodiment network component includes a Small Computer System Interface configured to receive a plurality of data blocks form one or more servers, a data library storage including tape storage, disk storage, or both that is configured to store the data blocks, a blocks-to-objects mapping engine configured to map the data blocks into a plurality of S3 objects, and a S3 interface configured to transfer the S3 objects to one or more locations for S3 storage over one or more networks.

22 Claims, 4 Drawing Sheets

SYSTEM AND METHOD FOR VIRTUAL TAPE LIBRARY OVER S3

TECHNICAL FIELD

The present invention relates to network data backup and storage, and, in particular embodiments, to a system and method for virtual tape library over S3.

BACKGROUND

A virtual tape library (VTL) is a data storage virtualization technology used typically for data backup and recovery purposes. A VTL presents a storage component (usually hard disk storage) as tape libraries or tape drives for use with existing backup software. Virtualizing the disk storage as tape allows integration of VTLs with existing backup software and existing backup and recovery processes and policies. The benefits of such virtualization include storage consolidation and faster data restore processes. Some current VTL solutions use SAS (Serial Attached (Small Computer System Interface (SCSI)) or SATA (Serial AT Attachment) disk arrays as a storage component due to their relatively low cost. The use of array enclosures increases the scalability of the solution by allowing the addition of more disk drives and enclosures to increase the storage capacity. The shift to VTL also eliminates streaming problems that often impair efficiency in tape drives as disk technology does not rely on streaming, and hence can write effectively regardless of data transfer speeds. By backing up data to disks instead of tapes, VTL increases performance of both backup and recovery operations.

While a virtual tape library is fast, the disk storage within is not designed to be removable, and does not usually involve physically removable external disk drives to be used for data archiving in place of tape. Since the disk storage is connected to power and data sources and is not physically isolated, it is vulnerable to potential damage or data corruption. Further, the VTL system is typically stateful. This means that when a failure occurs during the VTL system backup process, the backup process for the data needs to be restarted after system recovery.

S3 is another storage technology by Amazon™ for the Internet. It is a storage service that offers software developers a scalable, reliable, and low-latency data storage infrastructure at relatively low cost. S3 storage technology provides a web service interface that can be used to store and retrieve data, at any time, from anywhere on the web (the Internet). Using this web service, developers can build applications that make use of Internet storage. Since S3 is scalable, developers grow their S3 based applications as desired, without compromising on performance or reliability. S3 technology is flexible in terms of allowing the storing of different types and amounts of data, reading the same data as many times as needed and for emergency recovery, and building File transfer Protocol (FTP) or other web applications. S3 also offloads regulatory compliance requirements to service providers.

SUMMARY

In one embodiment, a method for virtual tape library (VTL) over S3 backup and restore includes mapping a plurality of data blocks for VTL storage into a plurality of S3 objects for S3 storage, and storing the S3 objects at one or more locations for S3 storage over one or more networks, wherein the mapping enables stateless backup and restore of the data blocks.

In another embodiment, a network component for VTL over S3 backup and restore includes a processor and a computer readable storage medium storing programming for execution by the processor. The programming including instructions to map a plurality of data blocks for VTL storage into a plurality of S3 objects for S3 storage, and store the S3 objects at one or more locations for S3 storage over one or more networks, wherein the mapping enables stateless backup and restore of the data blocks.

In yet another embodiment, a network component for VTL over S3 backup and restore includes a Small Computer System Interface (SCSI) configured to receive a plurality of data blocks form one or more servers, a data library storage including tape storage, disk storage, or both that is configured to store the data blocks, a blocks-to-objects mapping engine configured to map the data blocks into a plurality of S3 objects, and a S3 interface configured to transfer the S3 objects to one or more locations for S3 storage over one or more networks.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein to enable VTL backup (or storage) and retrieval over S3 storage technology. The embodiments include a VTL over S3 architecture that uses S3 storage technology. S3 is an Internet based storage technology, for storing data in a network or distributed environment instead of a centralized hard disk storage of typical VTL systems. To enable VTL over S3, data blocks and files (for tape media or disk media virtualized as tape media) are mapped to S3 objects suitable for S3 storage.

Unlike typical hard disk storage for VTL, S3 storage allows stateless backup (or storage) and retrieval, where a data backup or retrieval process can be recovered and resumed at the point where the failure occurred without restarting the process entirely. This can save considerable time and cost for network data backup and restore. Using S3 storage with VTL systems also provides other advantages such as scalability, availability at relatively low cost, and integration with the Internet environment and services. The data blocks mapped into S3 objects can be forwarded and stored in a S3 storage system (e.g., by Amazon™) and/or a Universal Distributed Storage (UDS) system by Huawei™, e.g., using the Internet infrastructure.

Figure 1:
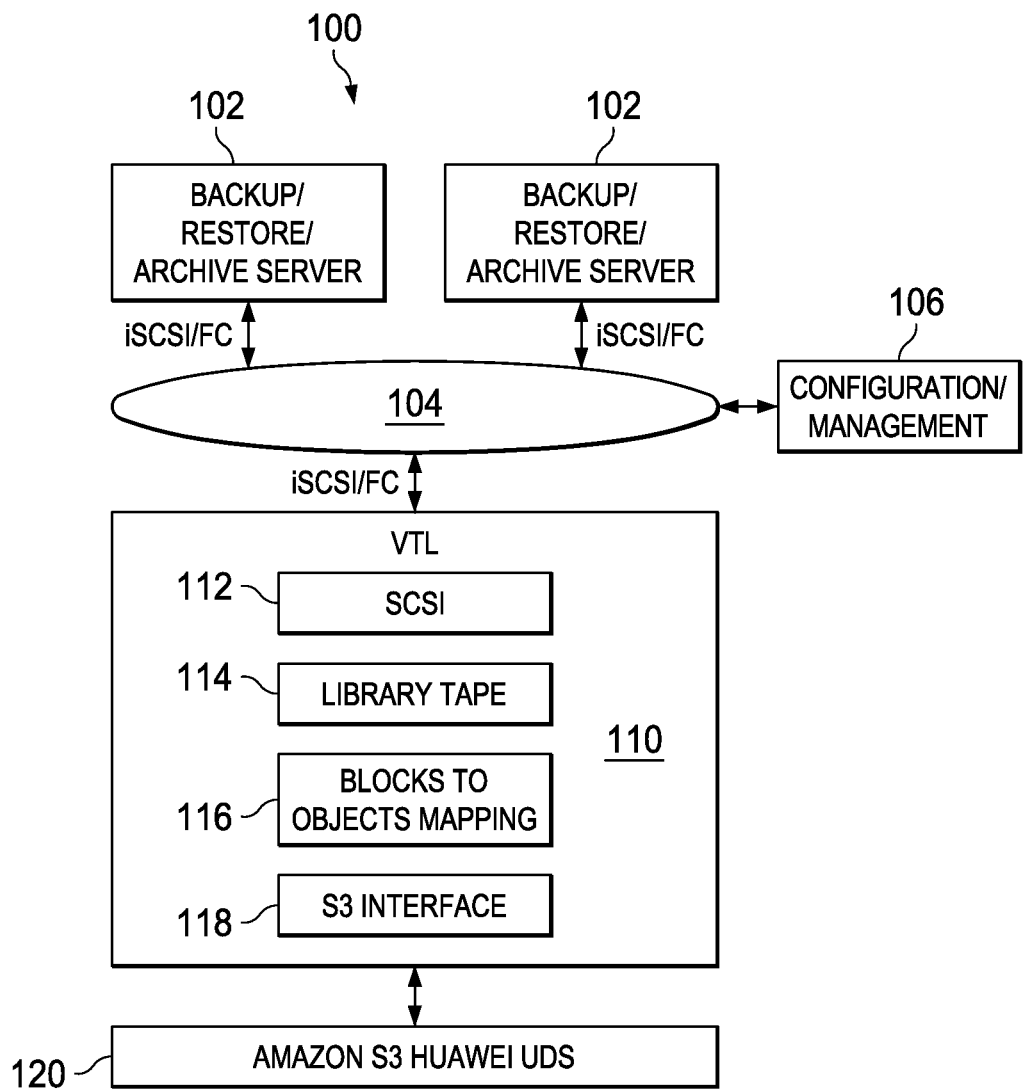
FIG. 1 illustrates an embodiment VTL over S3 system.

FIG. 1 illustrates an embodiment VTL over S3 system 100, which leverages VTL with S3 object storage. The system 100 includes one or more servers 102 for backup, restore, and/or archive operations, coupled to a network 104, such as the Internet and/or one or more other networks (e.g., LANS, WNAS, WLANS, etc.). The servers 102 can communicate with the network 104 via Internet SCSI (iSCSI) and/or fiber channel (FC) links. The network 104 may also include or be coupled to a configuration and management entity 106 for handling the configuration and management of the VTLs. The VTL can be implemented as a gateway 110 to the S3 storage, which is distributed network storage or Internet based storage also referred to herein as cloud storage.

The gateway 110 includes a SCSI 112 for connecting and transferring data (e.g., backup/restore data) between the gateway 110 and the network 104 using SCSI standards. The SCSI standards define commands, protocols, and electrical and optical interfaces. SCSI is commonly used for hard disks and tape drives, but it can connect other peripheral devices, such as scanners and CD drives. The SCSI standards define command sets for different peripheral device types. The gateway 110 also includes a data library storage 114, a blocks-to-objects mapping engine 116, and a S3 interface 118. The data library storage 114 includes a disk storage, a tape storage, other storage media, or combinations thereof. The blocks-to-objects mapping engine 116 is configured to map data blocks from the servers 102 and/or the data library storage 114 to S3 objects, as described below.

The data blocks are data formats suitable for tape or disk virtualized as tape, e.g., in suitable data files (at the data library storage 114). The S3 objects are data formats or files suitable for S3 (or cloud) storage and are sent to the S3 interface 118. The S3 interface 118 is coupled to one or more cloud based storage systems 120 including a S3 storage system, a UDS storage system, or both.

Figure 2:
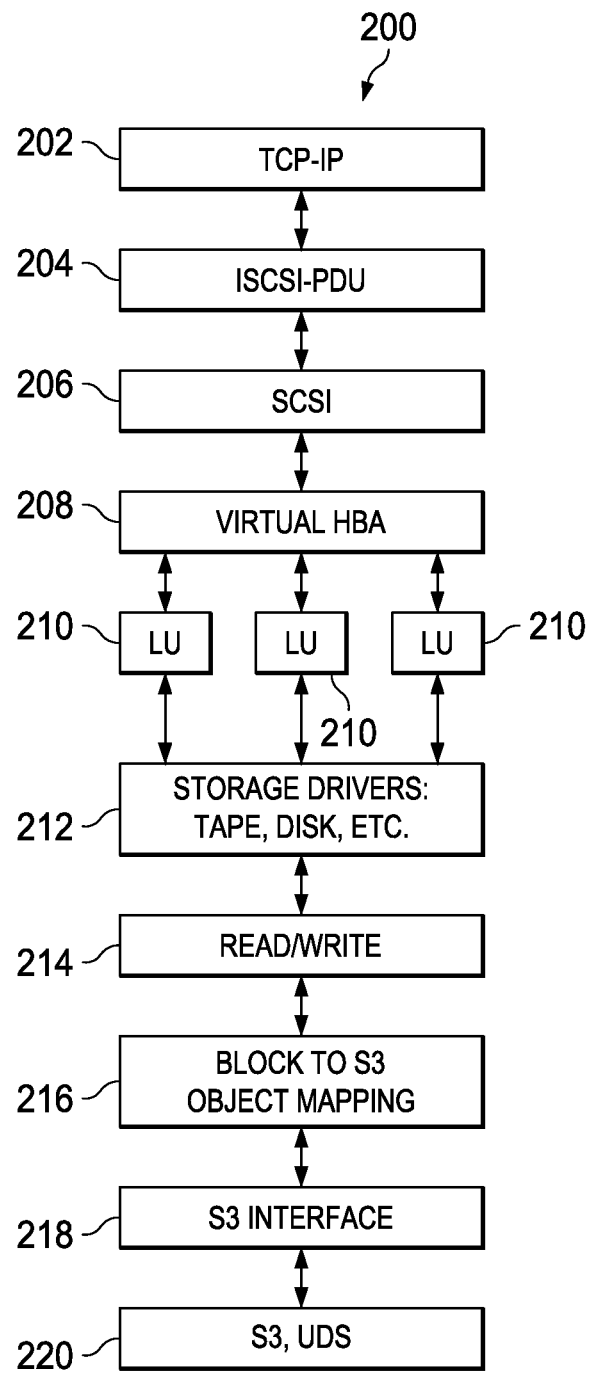
FIG. 2 illustrates an embodiment VTL over S3 architecture.

FIG. 2 illustrates an embodiment of a VTL over S3 architecture 200 that is used to enable VTL with S3 storage, for example in the VTL over S3 of system 100. The architecture 200 describes the data exchanges between different components and/or communications layers. The data (e.g., backup, storage, or retrieved data) can be exchanged between a Transmission Control Protocol (TCP)/Internet Protocol (IP) IP layer 202 (e.g., IP packets 202) and a SCSI function (e.g., at the gateway 110) via an ISCSI protocol 204 (e.g., protocol data units (PDUs)).

The SCSI function 206, in turn, exchanges the data with one or more storage drivers 212 (e.g., associated with the data library 114) via a virtual host bus adapter (HBA) 208 and one or more logical units (LUs) 210. The storage drivers 212 include, for example, drivers for disk storage, tape storage, and/or other storage devices at the data library store 114. The storage drivers 212 use write/read commands 214, a block to S3 objects mapping function 216, and a S3 interface 218 to map data blocks (for VTL) to/from S3 objects on S3/UDS storage systems 220

The VTL over S3 system 100 and architecture 200 can use both S3 storage and disk storage in different operating modes. For instance, in a minor mode, the data blocks are written to both S3 storage (as S3 objects) and disk storage at about the same time. After receiving a good status response from either one of the S3 and disk storages, the system returns a good status response to the application or client associated with the data. In a background mode, the system writes the data blocks to the disk storage. After receiving a good status response from the disk storage, the system returns a good status response to the application or client associated with the data. The stored data is then written to the S3 storage (as S3 objects) in the background operations, such as during scheduled periods. In other embodiments, the VTL over S3 system and architecture can use S3 storage without disk storage to backup or store the data.

In the VTL over S3 system 100 and architecture 200 that uses S3 storage, the data blocks in a data file for VTL are mapped to S3 objects suitable for S3 storage. However, the size of the data file, i.e., the size or number of data blocks, may not be suitable for one-to-one mapping between the data blocks and the data objects. In other words, the file comprise multiple data blocks may not be optimally or efficiently mapped to one S3 object due to aspects of the S3 storage system. One aspect is the lack of an "append" function in S3 storage technology. Thus, any update of a S3 object needs reading, modifying, and writing the entire S3 object back to S3 storage. Another aspect is, during a read command, the entire S3 object is read even if a portion or a small portion of the data (e.g., some of the data objects in the file) is needed. In view of such aspects, an appropriate number of S3 object is needed to efficiently map the data blocks in a file.

The data format for tape storage includes a tape-cartridge-barcode information associated with a set of data blocks (for one or more files), an auxiliary memory (MAM) file, an index file, and a data file. The tape-cartridge-barcode is mapped in the VTL system to a directory for the backup or storage data under a file system in disk storage. The MAM file is a relatively small file. The index file can be a relatively small, medium, or large file depending on the number of data blocks and indicates meta entries for the data blocks. The index file is mapped in the VTL system to an index file under the tape-cartridge-barcode directory. The data file is a relatively large file including the data blocks, and is mapped in the VTL system to a data file under the tape-cartridge-barcode directory.

For example, the tape-cartridge-barcode label (e.g., 00001) for the backup data is mapped to a directory tape00001 in a disk storage (i.e., c:\tape00001). The MAM is mapped to a "mamfile" and the filemark index table is mapped to a filemark index file in the directory tape00001 (i.e., c:\tape00001\mamfile and c:\tape00001\filemarkindexfile respectively). The index table is also mapped to an index file in the directory tape00001 (i.e., c:\tape00001\indexfile), and the data including the data blocks is mapped to a data file in the directory tape00001 (i.e., c:\tape00001\datafile).

To achieve efficient or optimal mapping between the data blocks and the S3 objects for S3 storage, a suitable and common data format is used that works for a plurality of different configurations of VTL systems without substantially impacting the performance of the backup or storage system. Specifically, the tape-cartridge-barcode is mapped to a "bucket", which is a container structure in S3 storage technology. The filemark index table is mapped to a S3 object, e.g., with the same name. The index table and the data are mapped to a plurality of S3 objects with file names each defined as index.X.Y.Z and datafile.X.Y.Z, respectively. In this file name format, index is the name of the resulting index object, datafile is the name of the resulting data object, X is a partition number, Y is a filemark number, and Z is a file number. Each resulting data object (S3 object) includes a plurality of data blocks and accordingly each corresponding index object comprises meta data entries associated with the data blocks. The number of data blocks is determined by an integer number of bits chosen in such a way that the size of the mapped object provides the best or optimized performance for cloud storage.

A suitable number of data objects (and corresponding index objects) is determined based on the number of bits or digits used to represent the block numbers. The block number is comprised of m bits or decimal digits in total (m is an integer). The least n significant bits or decimal digits of the block number (n is a pre-determined integer) are used to represent the block indexes per object. Thus, the fixed number of blocks per object is determined by the selected number n of least significant bits or digits. For example, if the block number comprises 3 decimal digits, the maximum number of data blocks is 1,000 (from 0 to 999). Using one least significant digit as block index per S3 object, the block index value can range from 0 to 9, and thus each S3 object can include a maximum of 10 blocks. If a first file comprises 1,000 Kilobytes (KB) of data and a second file comprises 2,000 KB, then the first file comprises 100 blocks and the second file comprises 200 blocks using a fixed size block of 10 KB.

Figure 3:
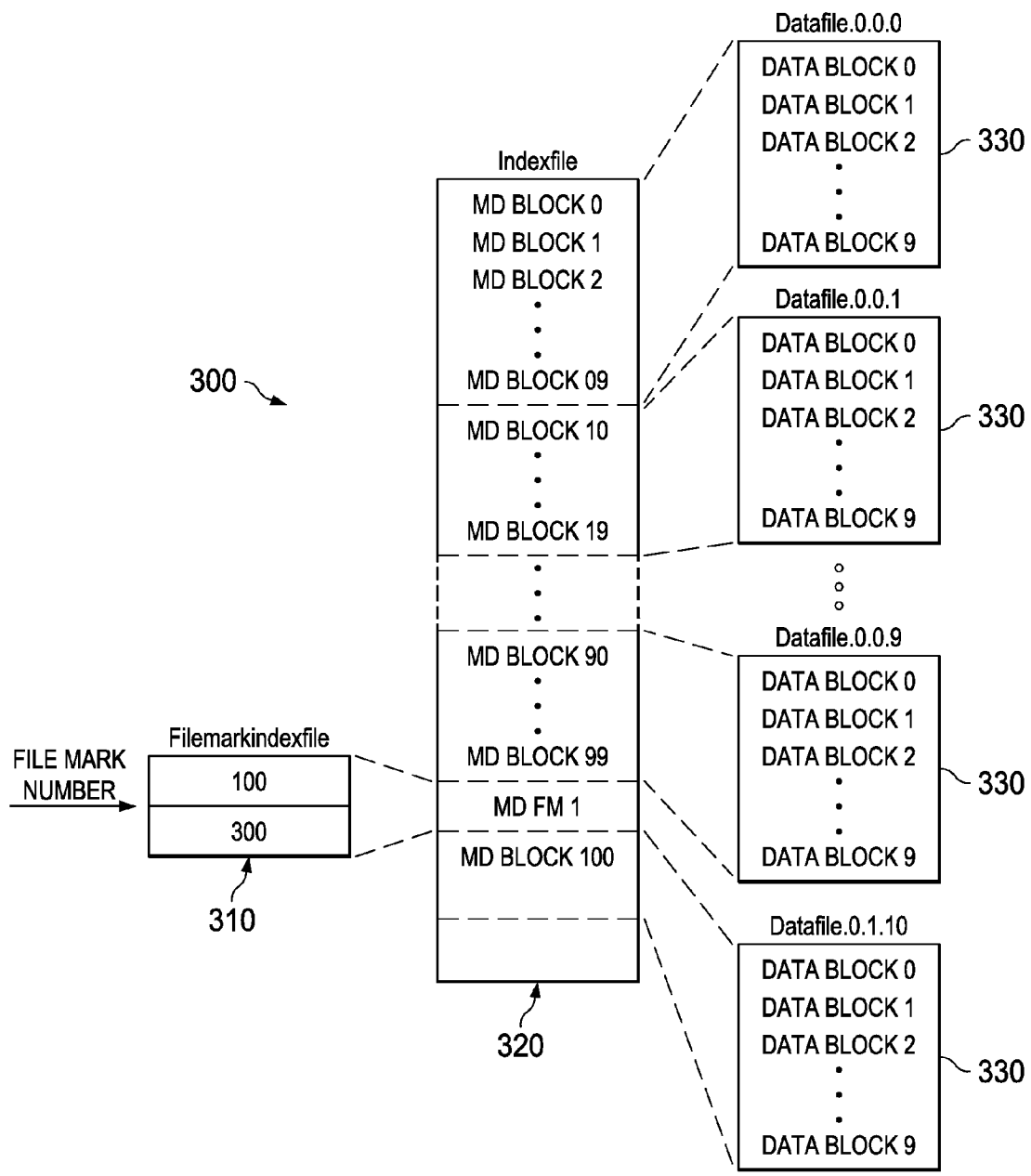
FIG. 3 illustrates an embodiment of a VTL over S3 data mapping scheme.

FIG. 3 illustrates an embodiment of a VTL over S3 data mapping scheme 300. The data mapping scheme 300 maps data blocks (for VTL) into S3 objects for S3 storage. The scheme 300 can be implemented in the system 100. During the backup process, the backup server 102 sends SCSI write commands to the VTL gateway 110. For a fixed block size configuration, the SCSI write command includes the starting block number and the number of blocks to be written. For a variable length block configuration, the SCSI write includes the block number and the length of the block. A pre-determined fixed number of blocks (e.g., n least significant bits of m bits block number) are mapped to a S3 object. The size of the S3 object depends on the size of each block. For the fixed block configuration, the size of this S3 object is equal to the product of the number of blocks and the fixed block size (number of blocks×block size). For variable length blocks, the size of the S3 object is the sum of the sizes of the blocks that are mapped to the object.

In the case of the fixed block size mode, the server 102 sends the command "write 20 100" to write 100 blocks starting from block number 0. Alternatively in the case of the variable length block mode, the server 102 sends "write 0 100" to write block number 0 with 100 data bytes. Under the variable length block mode, the server 102 writes one block at a time. As such, the block size may be varied from block to block. In the scenario of FIG. 3, the server 102 requests to backup two files using the fixed block size mode. The fixed block size is 10 KB, the first file (file 1) comprises 1,000 KB, and the second file (file 2) comprises 2,000 KB. For file 1, the server 102 needs to send 100 blocks (e.g., from block number 0 to 99). The server 102 can send any number of blocks at a time until all 100 blocks (for file 1) are sent to the VTL gateway 110. For each write command received at the gateway 110, each block is written to a local buffer (not shown) until the number of blocks written to the buffer is equal to the pre-determined fixed number of blocks per object. Subsequently, the data blocks in the buffer are written to S3 storage (in the cloud based storage system 120) as S3 objects 330 named datafile.X.Y.Z.

After sending the blocks for each file, the server 102 sends "write filemark" to write a filemark (i.e., a mark to end the file). If a "write filemark" is received by the VTL gateway 110 before the pre-determined fixed number of blocks is reached in the buffer, the data blocks in the buffer are also written to S3 storage as a S3 object 330 named datafile.X.Y.Z. The blocks in the buffer is mapped to a S3 object 330 by the blocks-to-objects mapping engine 116 and the S3 object 330 is sent to the S3 storage via the S3 interface 118.

The VTL gateway 110 may add meta entries for the blocks in an indexfile 320 consistent with current VTL systems. Additionally, for each data object 330, the gateway 110 maps the meta entries for the corresponding block to a respective index object (not shown) that is sent with the data object 330 for S3 storage. As such, the number of index objects is equal to the number of index files.

The location of the filemark for each file with respect to the location of the data blocks in the indexfile 320 is recorded in a filemark index file 310. The filemark index file 310 maps a filemark for each file to a block number (e.g., block number 100 for file 1 and block number 300 for file 2). This is consistent or compatible with current VTL systems that backup data to disk virtualized as tape. The filemark is usually used to expedite locating the blocks on a tape by the SCSI tape command "space file mark filemark count". Similarly for the file 2, the server 102 starts to write 200 blocks (e.g., from block number 100 to 299). At the end, the server 102 writes a filemark for the blocks of file 2 (e.g., at block number 300) to the indexfile 320.

The data objects 330 and corresponding index objects (not shown) are S3 objects or suitable for S3 storage, e.g., at the Internet. Tables 1 and 2 below show the block numbers associated with the data objects 330 and corresponding index objects for the file 1 and file 2, respectively. During the S3 mapping process, the system may keep a record of the beginning and end blocks for each file, e.g., in a database.

TABLE 1

Data and index objects for file 1 with 100 data blocks.

| Block number | Index file | Data file |
|---|---|---|
| 000 | index.0.0.0 | datafile.0.0.0 |
| 001 | | |
| ... | | |
| 009 | | |
| 010 | index.0.0.1 | datafile.0.0.1 |
| ... | | |
| 019 | | |
| ... | ... | ... |
| 090 | index.0.0.9 | datafile.0.0.9 |
| ... | | |
| 099 | | |

TABLE 2

Data and index objects for file 2 with 200 data blocks.

| Block number | index file | data file |
|---|---|---|
| 100 | index.0.1.10 | datafile.0.1.10 |
| 101 | | |
| ... | | |
| 109 | | |
| 110 | index.0.1.11 | datafile.0.1.11 |
| ... | | |
| 119 | | |
| ... | ... | ... |
| 290 | index.0.1.29 | datafile.0.0.29 |
| ... | | |
| 299 | | |

Figure 4:
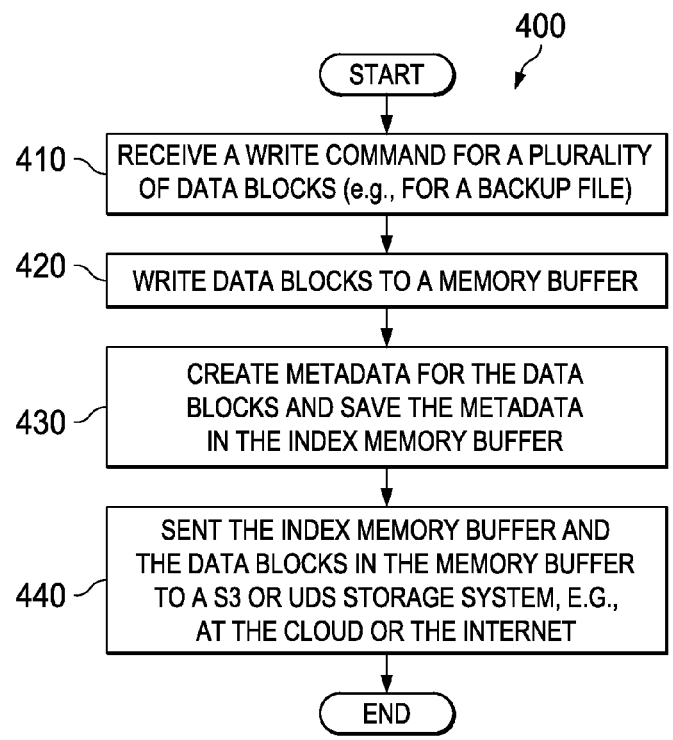
FIG. 4 illustrates an embodiment method for VTL over S3 data backup.

FIG. 4 illustrates an embodiment method 400 for VTL over S3 data backup. The method 400 may be implemented by the system 100, the gateway 110, or the blocks-to-objects mapping component 116 using software, hardware, or both. The method 400 includes steps for mapping data blocks for VTL to objects for S3 storage. At step 410, a write command for a plurality of data blocks (for a backup file) is received, e.g., from a server 102. At step 420, data blocks are written to a memory buffer. e. At step 430, the meta data for these blocks are created and saved in the index memory buffer. The data blocks are written to a buffer until the determined number of blocks per object is reached or a "write filemark" command is received. At step 440, the index memory buffer and the data blocks in the memory buffer are sent to a S3 or UDS storage system, e.g., at the cloud or the Internet.

Figure 5:
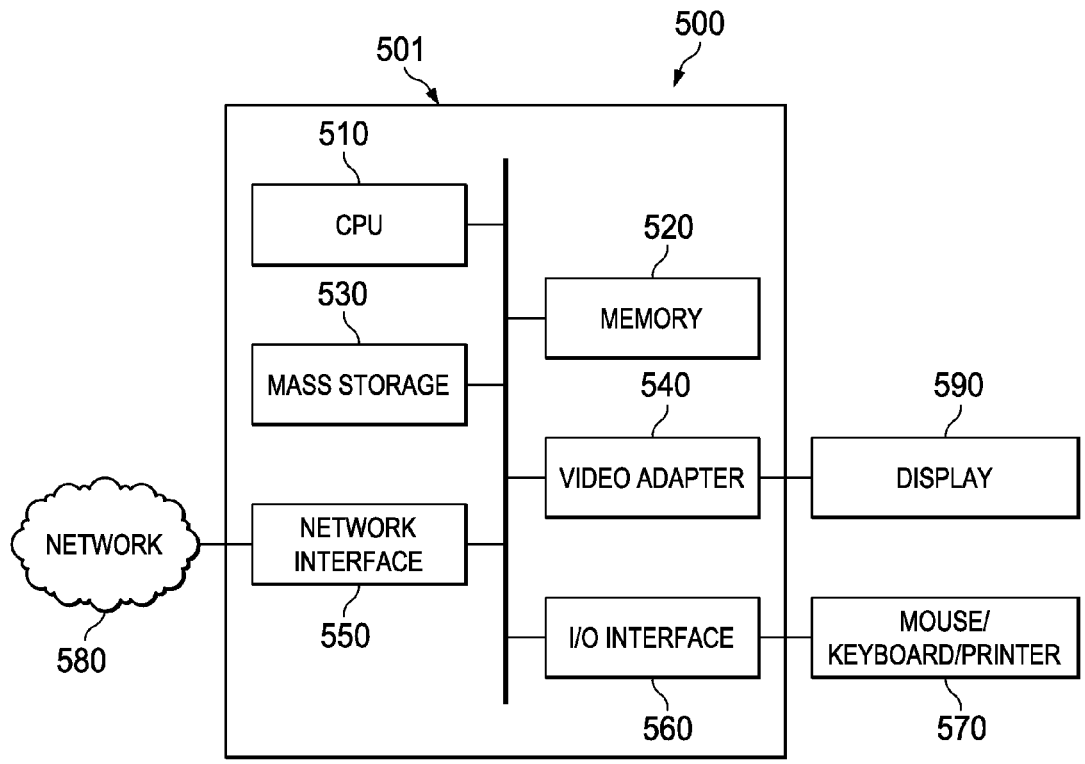
FIG. 5 is a block diagram of a processing system that can be used to implement various embodiments.

FIG. 5 is a block diagram of a processing system 500 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for virtual tape library (VTL) over cloud-based backup and restore, the method comprising:
    mapping a plurality of data blocks of VTL storage into a plurality of cloud-based objects for cloud-based storage, the VTL storage virtualizing tape storage for tape libraries or tape drives onto a disk storage; and
    storing the cloud-based objects at one or more locations for cloud-based storage over one or more networks,
    wherein the mapping enables backup and restore of the data blocks.

2. The method of claim 1, wherein mapping the data blocks into the cloud-based objects comprises:
    receiving a write command for the data blocks;
    determining a number of data blocks per cloud-based object;
    writing the data blocks to a buffer until the determined number of data blocks per cloud-based object is reached or a write filemark command is received;
    copying the data blocks in the buffer to a data object; and
    sending the data object to the one or more locations for cloud-based storage.

3. The method of claim 2 further comprising:
    writing meta data entries for the data blocks in the buffer to an index object corresponding to the data object; and
    sending the index object with the data object to the one or more locations for cloud-based storage.

4. The method of claim 2, wherein the number of data blocks per cloud-based object is a pre-determined number of data blocks that provides optimized performance for cloud-based storage.

5. The method of claim 4, wherein the data object has a size equal to a product of the determined number of blocks per cloud-based object and the data block size for fixed size data blocks.

6. The method of claim 2, wherein the number of data blocks per cloud-based object is determined by selecting one or more least significant bits of a plurality of bits that represent a data block number, and wherein the selected one or more least significant bits has a range that determines the number of data blocks per cloud-based object.

7. The method of claim 2, wherein the write command indicates a total number of the data blocks of backup and a starting index position for the data blocks with respect to other data blocks for backup.

8. The method of claim 7, wherein the total number of the data blocks is added to a next entry in a filemark index file upon receiving the write filemark command.

9. The method of claim 1 further comprising:
retrieve the cloud-based objects from the one or more locations for cloud-based storage; and
mapping the cloud-based objects into the data blocks.

10. The method of claim 1 further comprising storing the data blocks at a disk storage at about the same time as storing the cloud-based objects at the one or more locations for cloud-based storage.

11. The method of claim 1 further comprising storing the data blocks at a disk storage and storing the cloud-based objects subsequently in a background operation at the one or more locations for cloud-based storage.

12. A network component for virtual tape library (VTL) over cloud-based backup and restore, the network component comprising:
a processor; and
a non-statutory computer readable storage medium storing programming for execution by the processor, the programming including instructions to:
map a plurality of data blocks of VTL storage into a plurality of cloud-based objects for cloud-based storage, the VTL storage virtualizing tape storage for tape libraries or tape drives onto a disk storage; and
store the cloud-based objects at one or more locations for cloud-based storage over one or more networks, wherein the mapping enables backup and restore of the data blocks.

13. The network component of claim 12, wherein the cloud-based objects include data objects comprising the data blocks and index objects comprising meta data entries corresponding to the data blocks.

14. The network component of claim 13, wherein the meta data entries include a data block number, an object data file name, a data offset in an object data file, and other optional information including a compression flag that is set if data compression is used, an encryption flag that is set if encryption is used, and an encryption key if encryption is used.

15. The network component of claim 13, wherein the data objects have a name format data.X.Y.Z, where data is a name of a data object, X is a partition number, Y is a filemark number, and Z is a file number.

16. The network component of claim 15, wherein the index objects have a name format index.X.Y.Z, where index is a name of an index object, and X, Y, and Z are the same as in the name format of the corresponding data objects.

17. The network component of claim 12, wherein the programming includes further instructions to:
retrieve the cloud-based objects from the one or more locations for cloud-based storage; and
map the cloud-based objects into the data blocks.

18. The network component of claim 12, wherein the one or more locations for cloud-based storage belong to a Universal Distributed Storage (UDS).

19. The network component of claim 12, wherein the one or more networks include the Internet.

20. A network component for virtual tape library (VTL) over cloud-based backup and restore, the network component comprising:
a Small Computer System Interface (SCSI) configured to receive a plurality of data blocks from one or more servers;
a virtual tape library (VTL) storage that is configured to store the data blocks, the VTL storage virtualizing tape storage for tape libraries or tape drives onto a disk storage;
a blocks-to-objects mapping engine configured to map the data blocks into a plurality of cloud-based objects; and
a cloud-based interface configured to transfer the cloud-based objects to one or more locations for cloud-based storage over one or more networks.

21. The network component of claim 20, wherein the SCSI is coupled to the servers via one or more networks and via Internet SCSI (iSCSI) or fiber channel (FB) links.

22. The network component of claim 20, wherein the blocks-to-objects mapping engine is configured in case of failure of a backup or restore process to resume mapping the data blocks or retrieving the cloud-based objects in a manner where a data backup or retrieval process can be recovered and resumed from a point of failure without restarting the backup or restore process.

* * * * *